Dec. 9, 1958  C. W. KELSEY  2,863,274
LAWN EDGER WITH VIBRATORY BLADE
Filed April 12, 1956  3 Sheets-Sheet 1
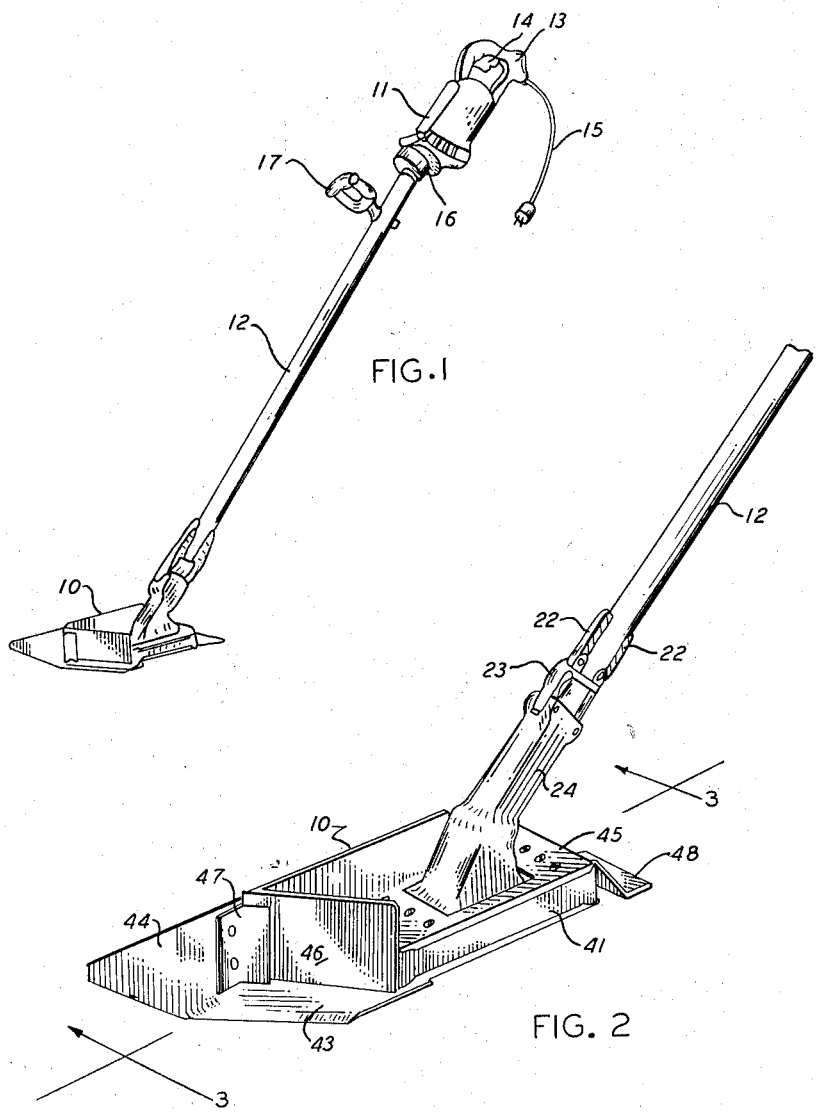
INVENTOR.
CADWALLADER W. KELSEY
BY Andros and Smith
ATTORNEYS Dec. 9, 1958 C. W. KELSEY 2,863,274
LAWN EDGER WITH VIBRATORY BLADE
Filed April 12, 1956 3 Sheets-Sheet 2

INVENTOR.
CADWALLADER W KELSEY
BY
ATTORNEYS

Dec. 9, 1958 C. W. KELSEY 2,863,274
LAWN EDGER WITH VIBRATORY BLADE
Filed April 12, 1956 3 Sheets-Sheet 3

INVENTOR.
CADWALLADER W. KELSEY
BY
*Andros and Smith*
ATTORNEYS

United States Patent Office 2,863,274
Patented Dec. 9, 1958

2,863,274

LAWN EDGER WITH VIBRATORY BLADE

Cadwallader W. Kelsey, Troy, N. Y.

Application April 12, 1956, Serial No. 577,881

6 Claims. (Cl. 56—26.5)

This invention relates to a lawn edger, more particularly to a power driven device for trimming the edge of a lawn or sodded area, particularly adjacent to walkways.

It long has been the custom to trim the edge of the sod adjacent to paths and walkways in domestic gardens and along the edge of sidewalks on the streets to give a neat appearance. This has been done by means of a spade-like hand tool which has been laborious and tedious. Many attempts have been made to devise a mechanical lawn edger, and such devices are known which are of a plow-like construction which use a cutting disc. These devices require considerable effort in their use, and are, in fact, not as effective as a more elementary hand tool.

It is therefore an object of the present invention to provide a device which will not only perform the operation of trimming the edge of lawns, but will do so with a minimum of effort on the part of the operator and at a maximum speed of operation.

Lawns growing over walks or driveways require both a vertical and a horizontal cut. This means edging the lawn and scraping the walk or driveway and removing the cut material to one side. This is all accomplished by the unique device which I have invented.

It is a further object of the present invention to provide a vibratory tool in which the cutting blade may be removed.

Other and further objects and advantages of the device will be clear from the following specifications, taken with the accompanying drawing, in which like characters of reference refer to like parts in the several views, and in which:

Fig. 1 is a perspective view of the device of the present invention;

Fig. 2 is a similar view on a larger scale, showing the lawn edger head;

Figure 3:
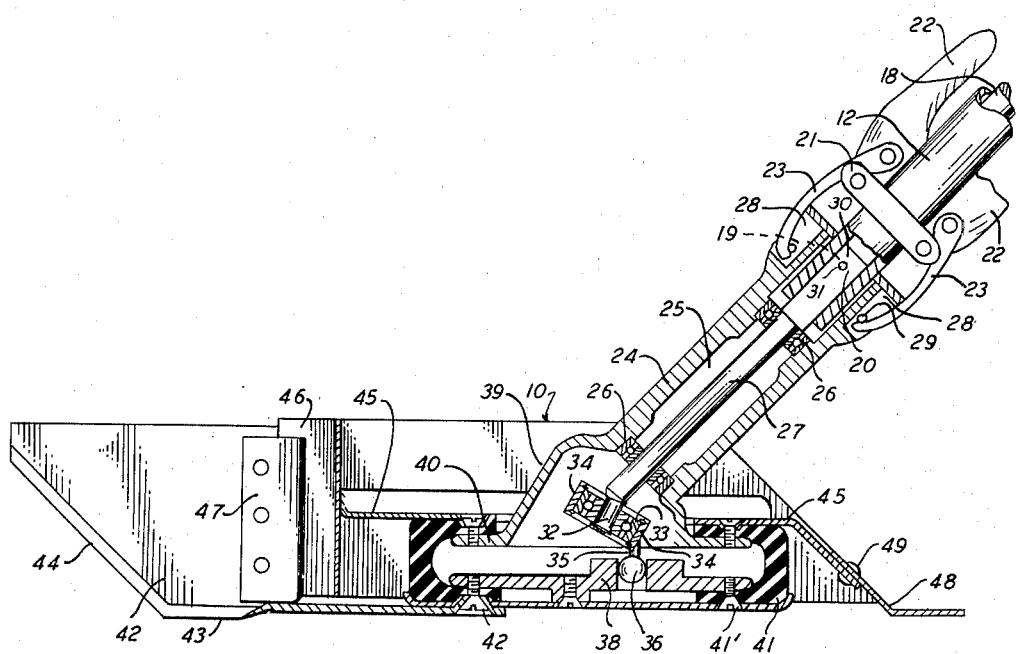
Fig. 3 is a longitudinal section on an enlarged scale taken on line 3—3 of Fig. 2.

Referring to Fig. 1, the device includes a lawn edger head designated generally at 10, a driving motor, designated generally at 11, and a drive shaft housing and handle 12.

The motor 11 may be a motor such as is used as a power hand drill, which may be provided with a handle 13 and a trigger 14, adjacent to the handle. Power is supplied to the motor through extension cord 15. The motor 11 is connected to the drive shaft within the handle element 12 through a gear box 16 to give the desired rotational speed to the drive shaft mounted within handle 12. It will be apparent, however, that if the motor used is one having the proper rotational speed, gear box 16 may be omitted and the motor connected directly to the drive shaft. A hand grip 17 may conveniently be mounted on shaft housing 12.

Referring now to Fig. 3, it will be seen that within the handle element 12 is a shaft 18 extending downwardly almost to the end of the handle. The lower end of said shaft 18 is provided with an end 19 of reduced size, in which there is a transverse slot 20. Mounted on the outside of handle 12 there is a pair of plates 21, to which is pivoted at each end a lever 22, to which, in turn, there is pivoted a hook 23 by means of which the drive shaft housing handle 12, may be disengagably connected to the lawn edger head 10.

The lawn edger head 10, as best seen in Fig. 3, has a main frame casting 24 having a bore 25, carrying bearings 26, in which are mounted shaft 27. The upper end of bore 25 is made of sufficient diameter to receive the lower end of handle 12. On the outer side of the frame casting, adjacent the bore, there are provided slots 28, bridged by pins 29, so that they may be grasped by hooks 23 in order that the frame casting 24 may be securely drawn into engagement with the handle 12.

The shaft 27 is provided at its upper outer end with a hollow extension 30 of a diameter to fit within the housing 12 and to fit over extension 19 of shaft 18. The hollow of shaft end 30 is spanned by a pin 31, which will fit into slot 20 of shaft end 19 to give a positive drive from shaft 18 to shaft 27. At the lower end of shaft 27 is an extension 32 of reduced diameter, having its axis at an angle to the axis of shaft 27. Mounted on shaft extension 32 is a ball or other appropriate bearing 33. Mounted about bearing 33 is a wobble element 34, provided with a downwardly extending pin 35, and a ball 36. The ball 36 is received in an aperture 37, in a vibrator plate 38.

Figure 4:
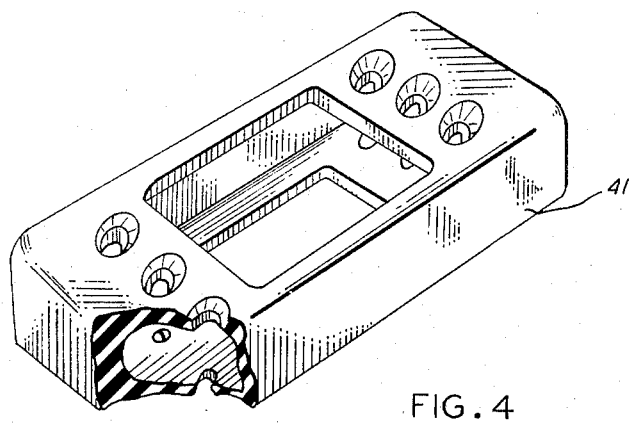
Fig. 4 is a perspective view, partially broken away of an elastic connector.

At the lower end of frame casting 24 there is an integral housing 39 which encloses the end of the shaft and the wobble element 34. Around the bottom edge of housing element 39 there is a flange 40, lying at an angle to shaft 27 but parallel to and above the plane of vibrator plate 38. Plate 38 is connected to and mounted on flange 40 by means of an elastic connector 41, which is seen by itself in Fig. 4. This elastic connector is made of rubber, or rubber-like substance, such as a synthetic rubber or resilient plastic, of such a character that it holds plate 38 in assembled relation with ball 36 and permits free vibration of plate 38 with respect to housing 39.

Fastened to plate 38 and extending forward beyond the end of elastic connector 41 is a blade 42 having a horizontal portion 43 and a vertical portion 44, preferably at right angles. The forward edges of portions 43 and 44 are sharpened to form a cutting blade. These edges are preferably set so that edge 44 extends downwardly and rearwardly from its upper edge, and portion 43 extends rearwardly in the plane of the bottom of plate 38 from the lowermost edge of portion 44.

Mounted on flange 40 at the top of elastic connector 41 is a guard element made up of a horizontal plate 45 and a vertical plate 46. Plate 46 lies inwardly of the plane of blade 44 extending along one side of elastic connector 41. The front edge of plate 46 is bent rearwardly across the front of the device to lie parallel to cutting edge 43. A shield 47 is mounted on blade 44 immediately in front of the bend of plate 46 to cover the space between plate 46 and blade 44 to prevent the accumulation of dirt in this space. This plate 47 must be spaced forward of plate 46 a distance so as not to strike against plate 46 during operation of the device. The rear end of plate 46 may be cut off at an angle as seen in Fig. 3 and the rear edge of plate 45 may be bent downwardly immediately behind elastic connector 41 to enclose and protect the elastic connector. There is preferably connected to the downward extension of plate 45 a rearwardly extending foot 48, secured by rivets or other securing means 49, to the lower edge of plate 45. This foot 48 supports the rear end of the device and takes the wear of moving the device along the ground.

If it is desired to use this device for other purposes than lawn edging, the edging blade 42 may be demounted.

Figure 5:
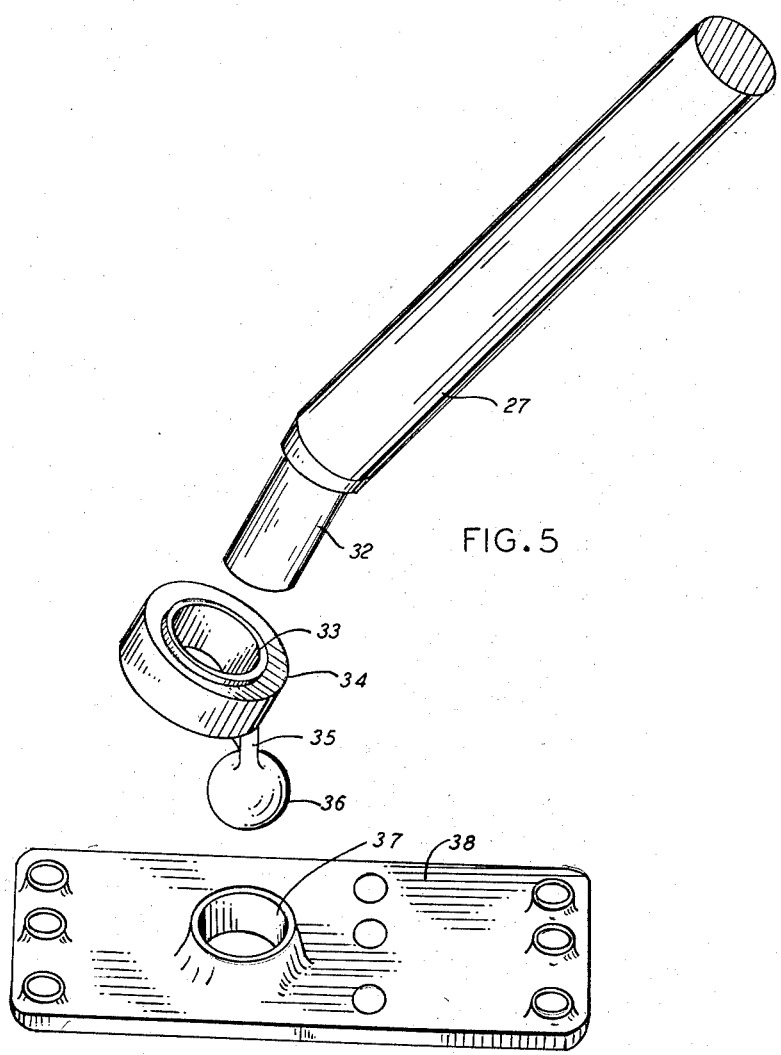
Fig. 5 is an exploded view on an enlarged scale, showing the vibrating means for the device.
Figure 6:
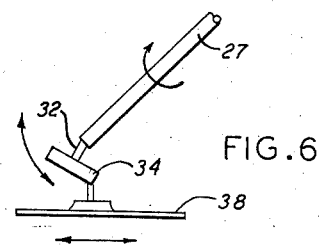
Fig. 6 is a diagrammatic illustration of the operation of the vibrating means.

The operation of the device is clear from Figs. 5 and 6, from which it will be seen that upon rotation of shaft 27, the shaft extension 32 will cause a wobbling action in wobble element 34. Since ball 36 is engaged in aperture 37, this wobbling motion is transmitted as a vibrating motion in 38. This vibration will be principally reciprocatory along the longitudinal axis of plate 38 in the plane of the shaft 27, since they are so aligned. There will be very little sideways vibration since ball 36 may be readily moved sideways regardless of the position of wobble element 34.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are invented to cover all of the generic and specific features of the invention herein described, and all statements of the scope of the invention, which, as a matter of language, might be said to fall therebetween.

Having described my invention what I claim as new and desire to secure by Letters Patent is:

1. A vibratory tool including a main frame and a vibrator plate to which a tool may be connected, a drive shaft rotatably mounted on and extending into said frame, an offset extension on the end of said shaft in said frame and disposed at an acute angle to said shaft, a bearing mounted for rotation on said offset extension, a wobble element mounted on said bearing, said vibrator plate being disposed at an angle to said shaft adjacent said wobble element, a driving connection between said vibrator plate and said wobble element and an elastic connector enclosing said driving connection, and to which said frame and said vibrator plate are connected, and a blade secured to said vibrator plate.

2. The vibratory tool as defined in claim 1, further characterized in that said driving connection includes a pin downwardly extending from said wobble element and terminating in a ball engaged in an aperture in said plate.

3. The vibratory tool as defined in claim 1, further characterized in that said elastic connector is of rubber.

4. The vibratory tool as defined in claim 1, further characterized in that said elastic connector has spaced-apart walls that are apertured to receive said frame portion and plate therebetween.

5. The vibratory tool as defined in claim 1 in which said blade is a lawn edger blade.

6. The vibratory tool as defined in claim 5 in which said lawn edger blade has a vertical and a horizontal cutting edge.

References Cited in the file of this patent

UNITED STATES PATENTS

| | | |
|---|---|---|
| 362,516 | Kenyon | May 10, 1887 |
| 1,660,764 | Pidlisny | Feb. 28, 1928 |
| 2,428,924 | Albertson | Oct. 11, 1947 |
| 2,559,725 | Mansperger | July 10, 1951 |
| 2,609,602 | Harshberger | Sept. 9, 1952 |
| 2,621,521 | Lewis et al. | Dec. 16, 1952 |
| 2,712,719 | Martin | July 12, 1955 |

FOREIGN PATENTS

| | | |
|---|---|---|
| 491,000 | Italy | Feb. 22, 1954 |